United States Patent [19]
Heller et al.

[11] 3,822,765
[45] July 9, 1974

[54] PLANETARY POWER STEER CROSS DRIVE TRANSMISSION AND CONTROL SYSTEM WITH LUBRICATION PASSAGES IN PLANET CARRIERS

[75] Inventors: Walter D. Heller, Washington; William W. Blake, Wyoming, both of Ill.

[73] Assignee: Caterpillar Tractor Co., Peoria, Ill.

[22] Filed: Mar. 10, 1972

[21] Appl. No.: 233,552

[52] U.S. Cl. .................. 184/6, 74/720.5, 180/6.7, 192/4 A
[51] Int. Cl. ............................................ F16h 37/08
[58] Field of Search ............ 74/720.5; 192/4 A, 4 R; 180/6.2, 6.3, 6.44, 6.7; 184/6

[56] References Cited
UNITED STATES PATENTS

| | | | |
|---|---|---|---|
| 2,781,858 | 2/1957 | Kelley et al. .................. | 74/720.5 X |
| 2,912,884 | 11/1959 | Christenson et al. .......... | 74/720.5 X |
| 2,941,639 | 6/1960 | Christenson et al. .......... | 74/720.5 X |
| 3,095,760 | 7/1963 | Christenson et al. .......... | 74/720.5 X |
| 3,239,020 | 3/1966 | Morris et al. ................. | 180/6.7 |
| 3,378,119 | 4/1968 | Schaefer ....................... | 74/720.5 X |
| 3,403,583 | 10/1968 | Maci et al. .................... | 74/720.5 |
| 3,535,954 | 10/1970 | Chambers et al. .............. | 74/720.5 |
| 3,572,166 | 3/1971 | Rains ............................ | 74/720.5 |

*Primary Examiner*—Samuel Scott
*Assistant Examiner*—J. Reep
*Attorney, Agent, or Firm*—Phillips, Moore, Weissenberger, Lempio & Strabala

[57] ABSTRACT

An improved track-type tractor transmission cross drive having a minimum reduction through use of planetary gears is provided. The cross drive enables modulation of power to an inside track for all but the smallest radius turns, while modulated brake operation enables essentially pivot steering to be accomplished. Enhanced oil distribution and cooling of brake elements are also provided. Also provided is a control system that produces powered turns as a function of steering wheel rotation. Phasing and modulation of low, high, and service brakes on each track are achieved by a cam controlled and boosted modulating reducing valve, selector spools, and an overriding service brake valve.

3 Claims, 14 Drawing Figures

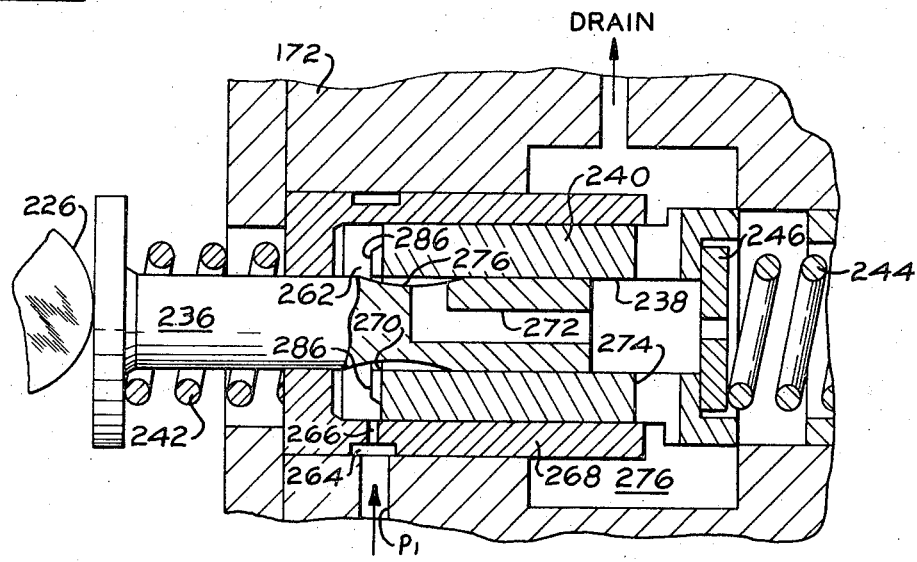
Fig-6-
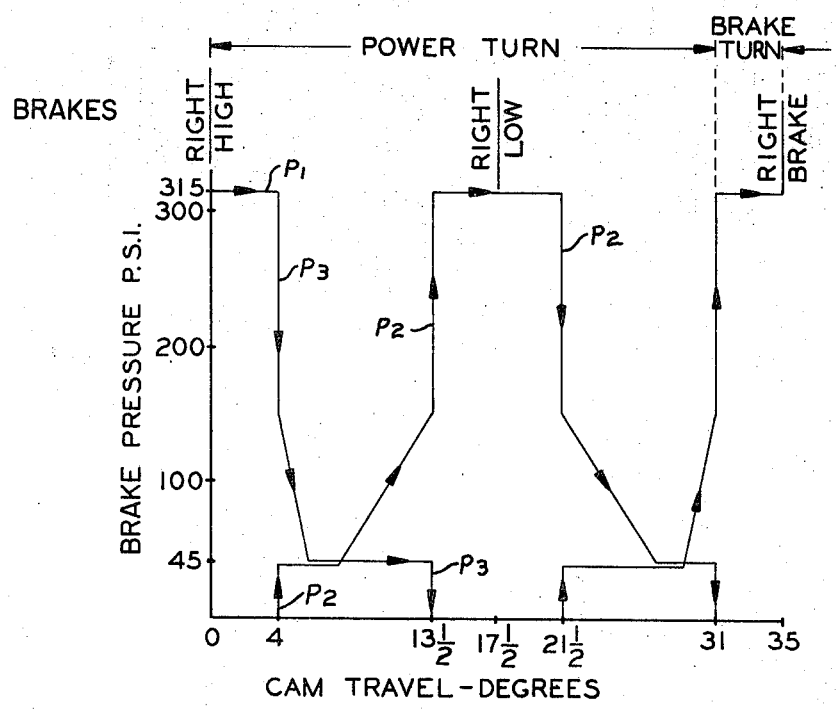
Fig-7-

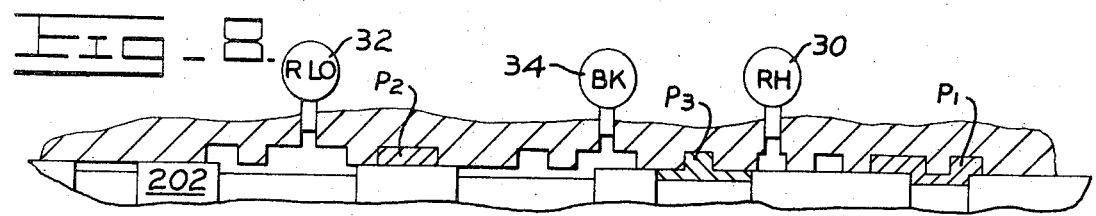
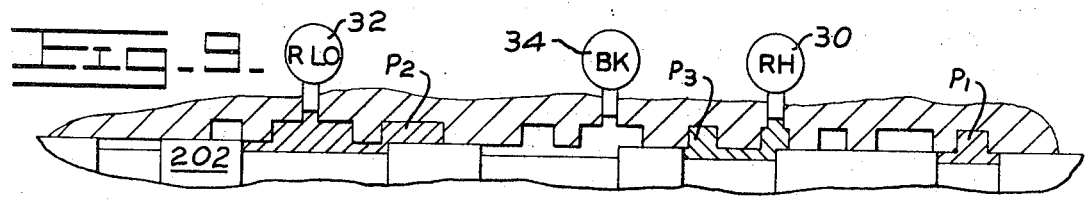
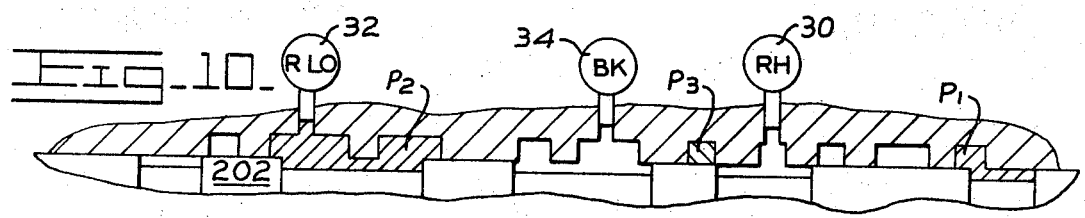
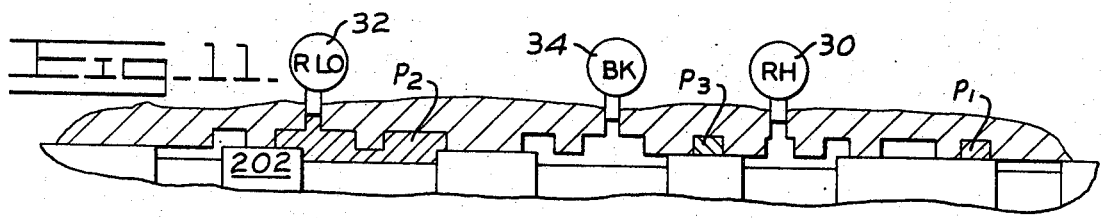
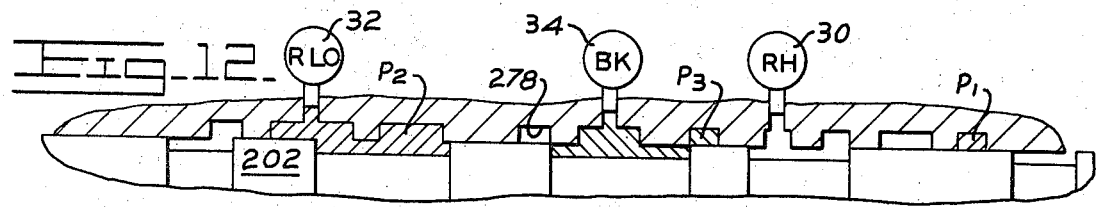
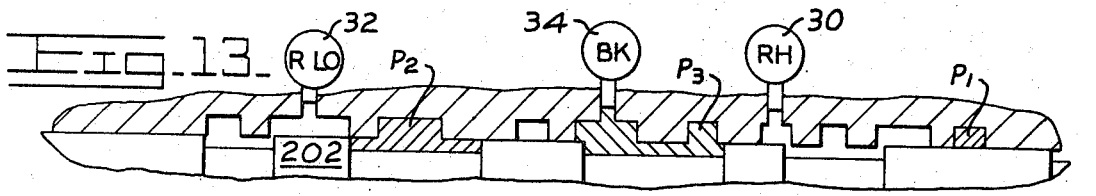
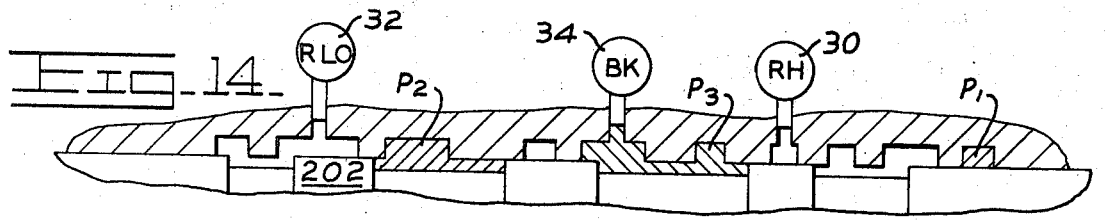

# PLANETARY POWER STEER CROSS DRIVE TRANSMISSION AND CONTROL SYSTEM WITH LUBRICATION PASSAGES IN PLANET CARRIERS

BACKGROUND OF THE INVENTION

This invention relates to an improved transmission cross drive and control system therefor. More particularly, this invention relates to an improved track-type tractor transmission cross drive which enables modulation of power to an inside track to provide powered turns and a control system which provides such turning as a function of steering wheel rotation.

The use of a high-speed, track-type tractor as a towing unit for scrapers in the earthmoving industry has been proposed as a solution for the problems attendant to use of rubber-tired towing units. While rubber-tired towing units are generally capable of higher speeds than track-type tractors in this environment, it is well recognized that they are not as efficient as such track-type tractors in the area of self-loading capability. It is reasoned that if a track-type tractor can be made which is capable of high-speed operation, thus alleviating its present major drawback as a towing unit, that such a unit would be more economic than the rubber-tired unit, at least in short-cycle scraper operations. Coincident with the desirability of high speed in such a track-type tractor unit is the desirability of a more responsive steering system and control system therefor.

Currently, most commercial tractors use band-type brakes and brake steering. It is recognized that such band-type brakes have limited capacity for a given drum size and require cooling systems and self-adjusting actuating linkages. Because of these problems, larger machines are being developed and introduced with disc-type brakes.

Currently, with brake steering, when the tractor unit is motivating a load, either by pushing or pulling, steering is accomplished by disengaging the brake which drives the inside track. The combination of the applied load and the friction forces on the opposite track provides the turning moment. If the load is rather light, it may also be necessary to brake the inside track to achieve the desired turning moment. If the load is pushing rather than pulling the tractor unit, there will be a tendency for the unit to turn in the direction opposite to the desired direction when the brake is released requiring the operator to resort to cross steering, i.e., disengaging the brake on the outside track. This has unfortunate consequences in that disengagement of the steering brake permits full power to be transmitted to the opposite track with a consequent loss of traction. Furthermore, cross steering problems are magnified at high speeds and with heavier loads to the point of being a substantial risk to safe operation of the machine. Also militating for powered steer in the above noted environment is the fact that reducing the speed of one track as well as braking same results in an overall speed reduction of the tractor unit during a turn thus undesirably negating its high-speed capability.

One solution to these problems is to provide a powered or geared steer cross drive system wherein the inside track is geared down with respect to the outside track while still receiving full torque. This has a real advantage in application to moving loads over difficult terrain as well as in other ways.

Several of the prior art power steer cross drive devices that have been developed utilizing this principle have the disadvantage of providing shift or gear ratios in addition to the desired steering function. As a result, the operator will not obtain the same response for a given rotation of the steering wheel when in first gear as would be received in third gear. Typically, in first gear, one turn radius would be achieved while in third gear a second and larger turn radius would be achieved. Accordingly, if the operator changes gears during a turn, the steering of the vehicle will change sometimes resulting in a step-wise maneuver which is as unsafe as it is unexpected. Yet another problem is that if this type of cross drive unit is shifted from low to a higher gear as required by condition, the net result might be the stalling of the tractor unit.

Yet another problem is that of providing a cross drive system which is smaller and more economical than current units. A further problem is providing a steering control system for such a cross drive which provides modulated power to the inside track when shifting down from or up to a lower or high gear, respectively, in a smooth manner which is proportional to steering wheel rotation. Such unit should also require a minimum of force from the operator in order to avoid excessive fatigue through continued use.

It is a further problem to provide proper oil distribution and cooling to the elements of such cross drive unit.

SUMMARY AND OBJECTS OF THE INVENTION

It is to a solution of the above-enumerated and other problems that the instant invention is directed. The invention takes the form of a power steer cross drive transmission and control system therefor. The subject cross drive provides power steering by utilizing two planetary transmissions to transfer power from bevel gears to a final drive system. The planetary gears provide a minimum reduction through planetary gears so that a smaller, more economical unit results. Each transmission contains a high and low and a service brake. The high and low and service brake systems are hydraulically operated and designed to slip into and out of engagement thereby producing an infinitely variable turning radius or, in the alternative, a step turn to a single fixed radius as by using the outside track in high and the inside track in low. Modulated brake operation is provided for essentially pivot steering. An enhanced lubrication system is provided. Standard levers and brake pedals are replaced with a steering wheel whereby the turning of the vehicle is accomplished as a function of the turning of the steering wheel.

It is therefore the primary object of this invention to provide an improved power cross drive transmission and control system.

It is a further object of this invention to provide an improved power steer transmission cross drive providing modulated power capability.

It is a further object of this invention to provide a power steer cross drive which is more compact and economical to produce.

It is a still further object of this invention to provide a power steer cross drive having an improved lubrication system.

It is a further object of this invention to provide a power steer cross drive and transmission control system providing a turning radius which is independent of gear ratio.

It is a still further object of this invention to provide a power steer cross drive and transmission control system providing for simplicity of construction and commonality of parts.

It is a further object of this invention to provide a transmission control system which is actuated as a function of steering wheel rotation.

It is a further object of this invention to provide a transmission control system that provides powered turns through steering wheel rotation by means of phasing and modulation of high, low, and to service brakes at anytime.

It is a still further object of this invention to provide a transmission control system having phasing and modulation of high, low, and service brakes achieved through use of cam-controlled and boosted modulating reducing valves.

It is a still further object of this invention to provide a transmission control system for controlling high and low and service brake units which are hydraulically operated to produce an infinitely variable turning radii or a step turn to a fixed turn radius.

It is a still further object of this invention to provide a transmission control system which is boosted to require a minimum force on the part of the operator for actuation.

BRIEF DESCRIPTION OF THE DRAWINGS

FIG. 6 is an enlarged view of a portion of the control system shown in FIGS. 3–5;

FIG. 7 is a graphical representation of clutch pressures as a function of the degree of steering wheel rotation;

FIGS. 8–14 depict a sequential arrangement of the selector spool positioned as follows:

FIG. 8: straight ahead, high brake engaged;
FIG. 9: low brake engaged;
FIG. 10: high brake disengaged;
FIG. 11: low brake centered;
FIG. 12: service brake engaged;
FIG. 13: low brake disengaged;
FIG. 14: full turn, service brake engaged, end of spool travel.

DETAILED DESCRIPTION
POWER STEER CROSS DRIVE

Figure 1:
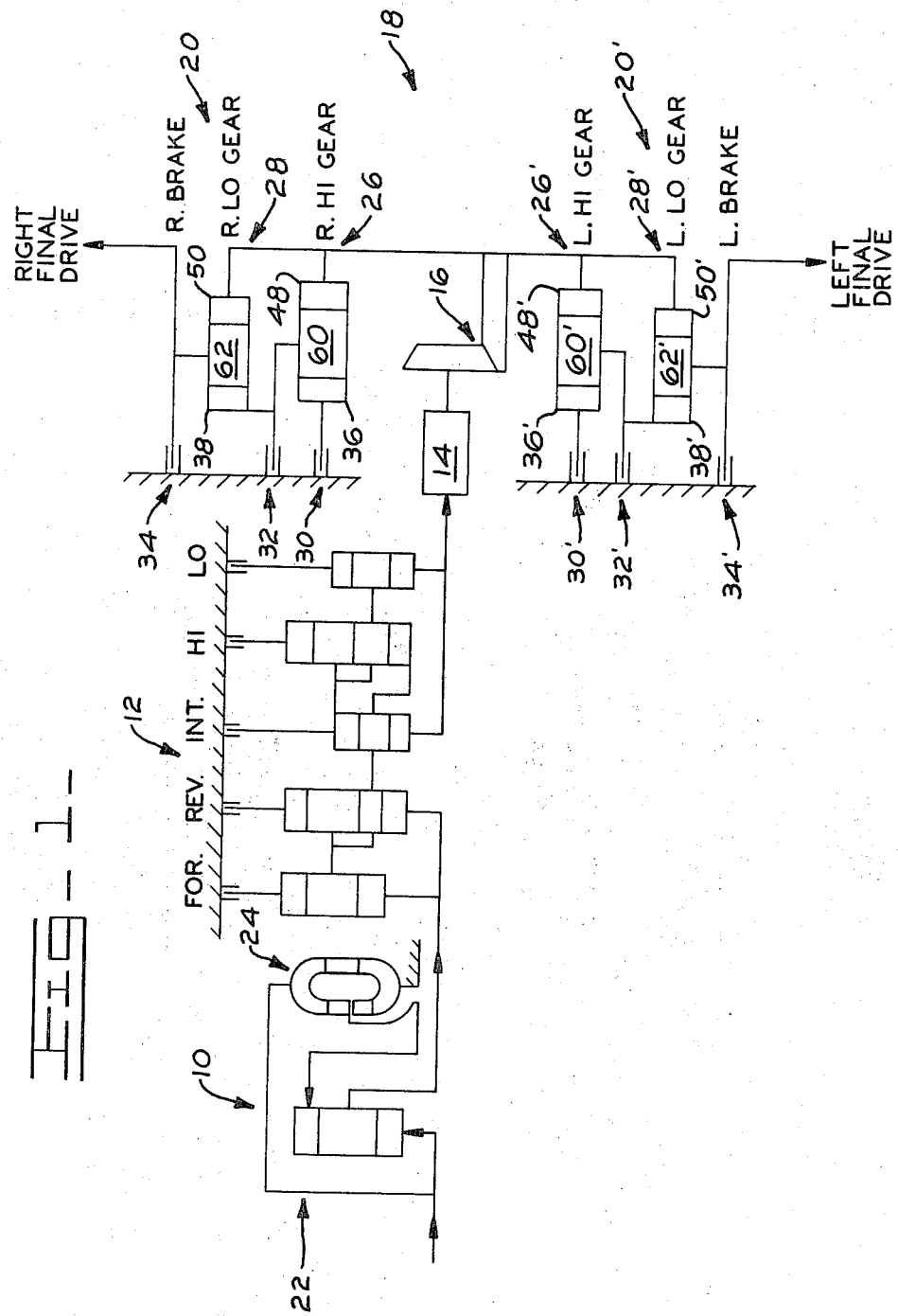
FIG. 1 is an overall schematic view of the instant cross drive illustrating its location in a power train environment.

Referring now to FIG. 1, there is shown an overall power train environment wherein an engine (not shown) delivers power to the front box generally shown at 10. From front box 10, power is directed to a power shift transmission generally shown at 12 and thence through a transfer gear box 14 where power is reduced to a pinion and bevel gear arrangement generally shown at 16. From the pinion and bevel gear arrangement power is transferred to a cross drive unit 18 having right and left cross drives 20, 20', respectively. The cross drives, in turn, direct power to right and left final drive units (not shown) for powering right and left tracks.

Front box 10 is conventionally of the split hydrodynamic output type having a single planetary set generally shown at 22 in combination with a torque converter 24 which may be of the Type 6 model as produced by Twin Disc Corporation. Characteristics of this front box 10 are that seventy percent of the torque is transmitted by the converter 24 while thirty percent is transmitted through the planetary set 22.

Power shift transmission 12 provides three forward and three reverse speeds and is as disclosed in Berchtold et al., U.S. Pat. No. 3,021,729, also assigned to applicants' assignee.

Since the speed ratios are provided by power shift transmission 12, the turning radii provided by cross drives 20, 20' are not affected by the gear ratios in the power shift transmission. As aforementioned, this produces the desirable result of rendering the same steering response to the operator whether in first or any other gear. For example, the same turning radius will be experienced in all gears, even though one cross drive is in high while the other is in low.

Each cross drive 20, 20' comprises a first planetary set 26, 26' and a second planetary set 28, 28', respectively. Each cross drive also comprises three stationary disc brakes 30, 30'; 32, 32'; and 34, 34'. The control system for these brakes comprises a hydraulic package consisting of selector spools, automatic and manual modulating spools and attendant actuating mechanism which will be more fully described hereinafter under the heading of "Control System." It suffices to say that modulation of brake engagement pressures controls the speed of planetary ring gears 36, 36' and 38, 38' of planetary sets 26, 26' and 28, 28', respectively, so as to produce variable turning radii. For very short turning radii approximating pivot steer, brake discs 34, 34' are selectively modulated to provide such steering.

Figure 2:
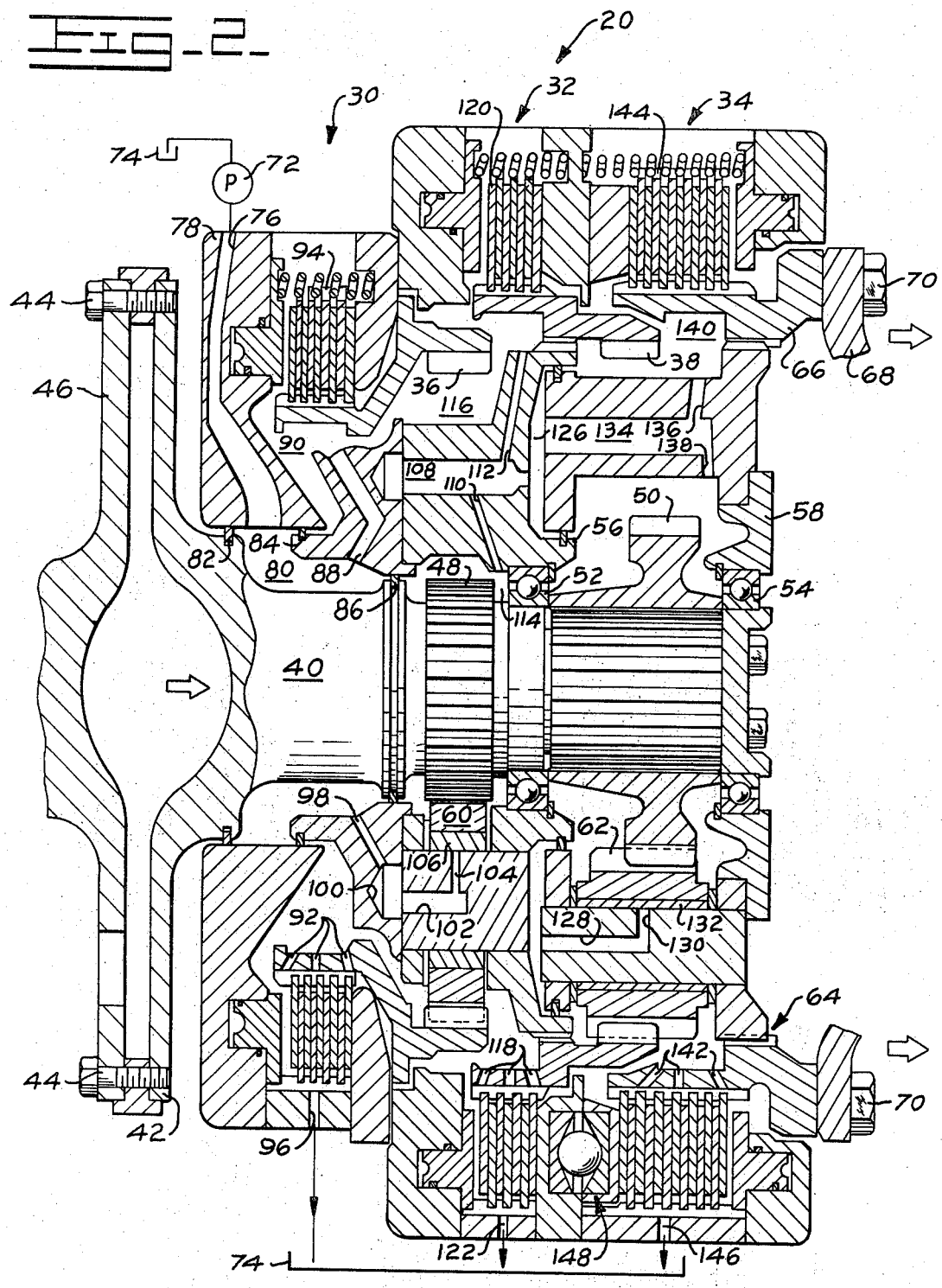
FIG. 2 is a side elevational view in partial cross section of the cross drive of the instant invention illustrating parts thereof.

FIG. 2 shows a more detailed cross-sectional representation of the right cross drive 20 of the power steer cross drive unit 18, which cross drive is identical with the left cross drive. Power is input from the aforementioned bevel gears (not shown) which are linked to a drive shaft 40 having a flanged portion 42 secured by conventional means such as bolts 44 arranged around the periphery thereof to a flanged portion 46. Ranged along shaft 40 in serial order are a pair of sun gears 48 and 50 which form a part of planetary sets 26 and 28, respectively. Suitable bearings 52, 54, are provided for rotative mounting of shaft 40 in bores in planet carriers 56 and 58. High gear is provided by the conjunctive action of sun gear 48 with sun gear 50. Alternatively, sun gear 50 alone provides low gear.

Referring again to FIG. 1, when both of the brake pairs 30, 30' are engaged, the cross drive will be in its high speed mode. This holds ring gears 36, 36' whereby a split torque path is realized so as to achieve a reduction of approximately 2.05:1. Returning again to FIG. 2, in this mode, sun gear 48 drives planet carrier 56 through the action of planets 60 as well as ring gear 38 of the second planetary unit 28. Since sun gears 48 and 50 are on the same drive shaft 40, sun gear 50 provides a second power path to planets 62.

Planets 62 in turn provide power to planet carrier 58 and thence through a splined connection 64 intermediate said carrier and an intermediate flange member 66. Intermediate flange member 66 is connected to an output flange 68 by conventional means such as bolts 70. From output flange 68 power is transmitted through suitable transfer gearing (not shown) to a bull gear and sprocket drive (not shown) in a conventional manner. It may be noted that the subject invention's split torque path decreases the loading on the various planetary components and consequently provides a more compact and economical structure.

To provide a 19 foot radius turn in any of the three gear ratios provided by power shift transmission 12 (FIG. 1), brake 32 is engaged so as to hold ring gear 38 stationary. This results in an approximately 3:1 reduction through the second planetary unit 28. This is accomplished by sun gear 50 urging planets 62 to revolve around stationary ring gear 38 and thus provide a reduced drive through the output planet carrier 58.

As seen in FIGS. 1 and 32, engagement of brake 34 provides modulated brake steering in accordance with the degree of modulation of brake 34 transmitted through intermediate flange member 66. As will be hereinafter described, the control system is such that the vehicle operator steers with a single steering wheel (not shown). By slowly rotating the steering wheel in a clockwise direction, a gradual disengagement of the high range or gear brake 30 and a gradual corresponding engagement of the low range brake 32 occur. With further turning of the wheel, the low range brake 32 is gradually disengaged while the brake 34 is gradually engaged to the point of full engagement.

Thus, for an increasingly tighter turn in the right or clockwise direction, the following sequence occurs: high gear brake 30 gradually disengages, low gear brake 32 gradually engages to a predetermined position point wherein it completely holds ring gear 36 stationary, and thence brake 32 is gradually disengaged and brake 34 engaged until brake 34 holds intermediate flange 66 and thereby output flange 68 completely stationary for an essentially pivot turn.

In order to dissipate heat generated by the brakes in carrying out the above operation, the cooling system hereinafter described is provided. A lubricant pressure source in the form of a pump 72 directs lubricant such as oil from a sump 74. Flow is directed through an input passage 76 in housing 78 of cross drive 20 and thence to a chamber 80 which is sealed by running piston rings 82, 84, and 86. The lubricant flow is divided such that approximately 25 percent of the flow is directed to each of brakes 30 and 32 while the remaining 50 percent is directed to brake 34 as follows:

From chamber 80, three passages, one of which is shown at 88, distribute lubricant to high gear brake 30 by way of chamber 90 and a series of directing passages 92. Lubricant flows across disc brake pack 94 of brake 30 where it absorbs heat and then passes to sump 74 by way a plurality of slots 96 arranged around the housing.

In a similar manner, lubricant from chamber 80 is directed to three passages, one of which is shown at 98, to annular chamber 100 and thence through passages 102 and 104 to the bearings of the three planet pinions, one of which is shown at 106. Lubricant is also directed from annular chamber 100 through passage 108 and thence to branch passages 110 and 112. Lubricant is directed from passage 110 into chamber 114 surrounding sun gear 48. Additionally, lubricant is directed through passage 112 into chamber 116 and thence through a plurality of passages 118 to brake disc pack 120 of low gear brake 32. Lubricant then passes to sump through a plurality of slots 122 arranged like slots 96.

Lubricating fluid also flows from passage 108 to an annular chamber 126 and thence into axial central passages 128, 130, internal of each planet pinion 62 for lubrication of bearings 132.

Lubricant is also directed from annular chamber 126 through three passages 134 and branch passages 136, 138 to chamber 140 and thence to a plurality of passages 142 communicating with brake disc pack 144 of brake 34. Lubricant then passes to sump through a plurality of slots 146 also arranged like slots 96.

Additional flow is also directed through generally radially directed passages 138 to service bearings 54. It should be noted that the planet carriers 56 and 58 are nested in order to provide such distribution.

A self-energizing parking brake utilizing a ball-and-ramp type structure, generally shown at 148, is also provided. This brake may be of the type conventionally shown in U.S. Pat. No. 2,375,855. The parking brake may be actuated by separate hand brake means (not shown). By way of contrast, depression of the service brake pedal (not shown) engages brakes 34, 34' of cross drives 20 20', respectively.

CONTROL SYSTEM

Figure 3:
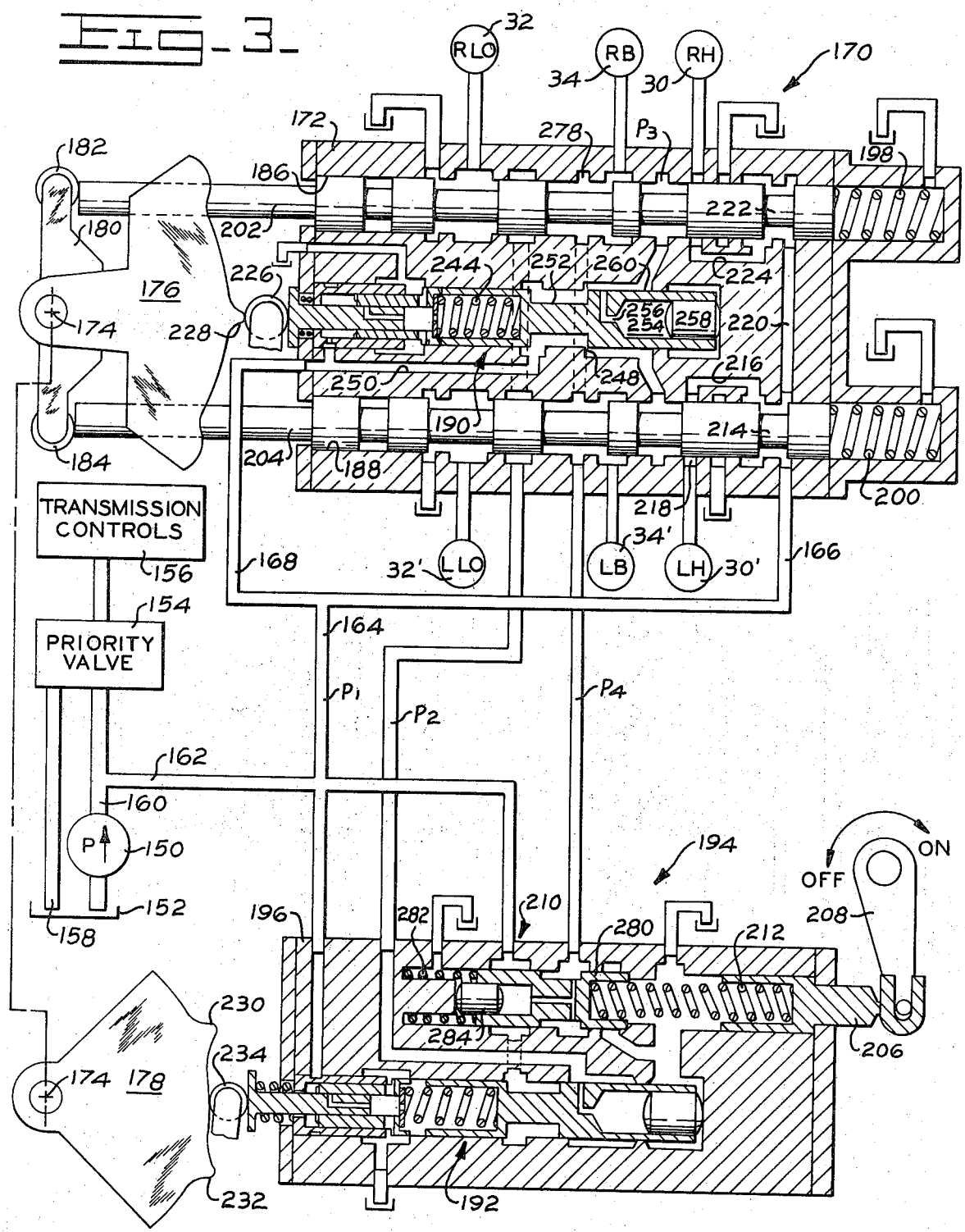
FIG. 3 is a partial, cross-sectional elevational view of the control system of the instant invention with the parts thereof positioned for straight-ahead steering.

FIG. 3 shows the control system of the instant invention in its neutral or normal position. Pressure fluid for both the steering and transmission control is supplied by the transmission pump 150 directing fluid from a sump 152. A priority valve 154 is provided to give the steering control system hereinafter described priority over the transmission control system 156. Priority valve 154 functions essentially as a relief valve which opens to direct fluid to the transmission control system 156 from the pump 150 at a predetermined pressure, i.e., 215 psi. Return line 158 directs any internal leakage past the priority valve spool (not shown) back to sump. Transmission controls 156 may be the type disclosed in U.S. Pat. No. 3,091,976, also assigned to applicants' assignee.

Fluid from pump 150 is directed through suitable conduits or lines 160, 162, 164, 166 and 168 to a pair of selector valves generally shown at 170 contained in an integral housing 172. These valves are, in turn, actuated by a steering wheel (not shown) acting through a common shaft 174 so as to motivate upper cam 176 and lower cam 178 pivotally attached thereto. It should be noted that while cams 176 and 178 are actually superimposed, they have been shown in adjacent relation in the drawing for purposes of clarity. It should also be noted that cam rotation through the common shaft 174 is actually one-half the angular position of the steering wheel (not shown). That is to say, a full right turn of a steering wheel which is limited to 70° from the straight-ahead position corresponds to a cam rotation by way of shaft 174 of one-half that amount or 35° through use of appropriate gearing (not shown).

Upper cam 176 is connected to a lever 180 for pivotal movement thereof in the clockwise direction corresponding with a right turn as well as the counterclockwise direction corresponding with a left turn. Rollers 182, 184 are mounted at each end of lever 180 for motivating a pair of upper selector valve spools 202, 204 reciprocable in spaced, parallel bores 186, 188 in housing 172, respectively.

Generally, upper cam 176 positions a boosted pressure reducing valve system generally shown at 190 of valve 170 for modulated control of the high and low gear brakes 30, 30', 32, and 32', while lower cam 178 positions a similar boosted pressure reducing valve system 192 of valve 194 having a housing 196 for modulated control of the service brakes 34, 34'.

Springs 198 and 200 located within the rightmost end of bores 186 and 188, respectively, containing valve spools 202 and 204 serve to center the valve spools to the neutral position shown as well as provide the principal steering wheel "feel" sensed by the operator.

A foot-operated service brake pedal (not shown) positions a load piston 206 of valve 194 by means of a brake pivot lever 208 to which it is pivotally connected. As will be more fully hereinafter described, positioning of load piston 206 acts on a pressure reducing valve shown generally at 210 through spring 212 to provide modulated pressure fluid to both right and left service brakes 34 and 34' from a range of 0 to 315 psi as a function of input load, as will be hereinafter described.

In the straight-ahead position shown in FIG. 3, pressure fluid is directed from pump 150 through lines 160, 162, 164, and 166 around annulus 214 in valve spool 204 and thence by way of internal passage 216 and annulus 218 to the left high gear brake 30'. In a similar manner, fluid is directed through cross passage 220 around annulus 222 and passage 224 to right high gear brake 30. At this point, no pressure fluid is directed to the remaining brakes 32, 32', 34, and 34', as seen in this figure and in FIG. 8.

As the steering wheel (not shown) is turned, the upper cam 176 is rotated so as to release the load on the high-brake reducing valve system 190 through the mechanism of cam follower 226 riding off projection 228. At the same time, the lower cam 178 increases the load on the reducing valve system 192 due to the inherent cam profiles having a pair of projections 230, 232 adapted for engagement with cam follower 234.

FIG. 6, which is an enlarged portion of such a reducing valve, best illustrates the operation of such system. For convenience, reducing valve 190 is discussed; however, it is to be understood that identical reducing valve 192 operates in the same manner. Rotation of the steering cam moves the cam follower 226 to the left, as seen in the drawing, or to the right since it is pivotally secured to the housing in any suitable manner (not shown).

The rightward movement of cam follower 226 causes reducing valve spool 236 to move rightwardly within a bore 238 in piston 240 against the bias of spring 242. Piston 240 itself is urged leftwardly through the action of spring 244 which acts on seat 246. The spring force is dependent upon hydraulic pressure $P_3$ downstream of metering edge 248 metered from passage 250 and annulus 252 past the metering edge. Hydraulic pressure thus metered enters chamber 254 via passage 256 where it acts upon a slug 258 in the right end of modulating reducing valve spool 260.

Returning to FIG. 6, a counter-balancing pressure force is provided by a pressure in a chamber 262 at the left end of piston 240. This pressure is achieved by pressure $P_1$ directed from the pump through annular opening 264 and intermediate booster inlet orifice 266 disposed within stationary cylinder 268.

Rightward movement of spool 236 restricts fluid from passing to a drain by way of the metering edge 270, and internal passage 272 and cross passage 274 in spool 236. A shallow annular depression 276 serves as an inlet to passage 272.

The restriction formed by the metering edge and the shallow depression causes a buildup of pressure in chamber 262 dependent upon the inlet rate of orifice 266 and causes piston 240 to move rightwardly with the following effect. Returning to FIG. 3, the movement of piston 240 permits a predetermined maximum preload on spring 244 and determines pressure $P_3$. In like manner, pressure reducing valve system 192 established pressure $P_2$. It may be thus seen that pressure $P_2$ is controlled by lower cam 178 while pressure $P_3$ is controlled by upper cam 176.

Assuming for the sake of illustration a four degree turn of steering control shaft 174, valve spool 202 moves rightwardly to the position shown in FIG. 9. In this new position of spool 202, the upper pressure reducing valve system begins to modulate pressure $P_3$ to right high gear brake 30. At the same time, right low gear brake 32 is communicated with pressure $P_2$ at approximately 45 psi which is the initial setting of the lower reducing valve system.

Figure 4:
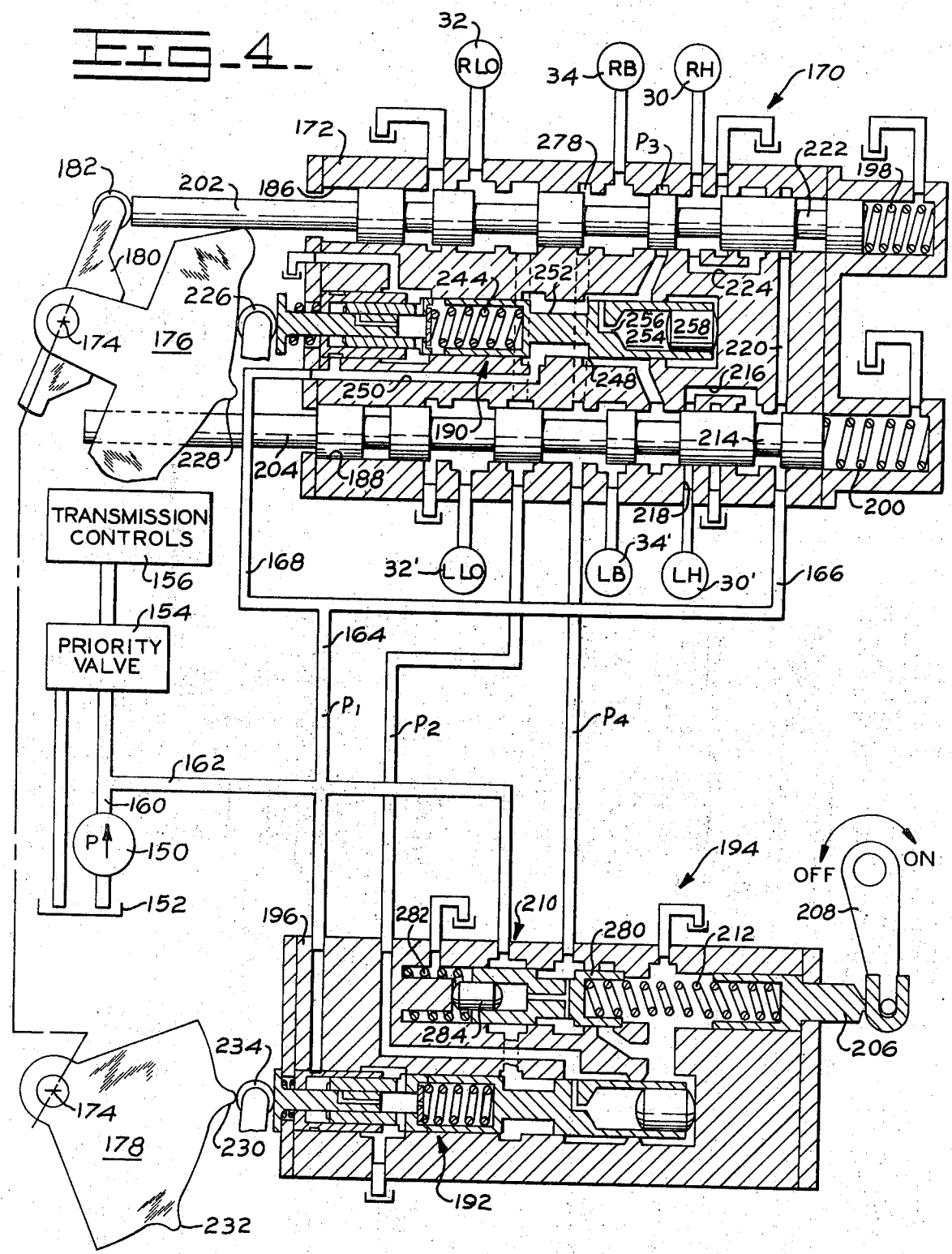
FIG. 4 is another view of the same with parts thereof positioned for a half turn.

As turning continues, the cams control brake pressures in accordance with their profiles. Right low gear brake 32 is fully engaged and right high gear brake 30 fully disengaged at half turn (corresponding to 13 ½° of cam rotation). The state of the valves is shown in FIG. 4, while the position of spool 202 at this half-turn position is shown in FIG. 10.

FIG. 7 graphically illustrates the effect of turning steering control shaft 174 (FIG. 3) graphing pressure as a function of degrees of cam travel. As seen in the graph, pressure in the right-hand brake is constant at 315 psi until 4° of cam travel is achieved. At this point, pressure in the right high gear brake takes a stepwise drop while pressure in the right low gear brake takes a smaller stepwise increase.

As best seen in this FIG. 7, between about 5 and 12.5° of cam travel (corresponding to 10 and 25° of steering rotation), a slipping brake state exists on the inside track. However, and as shown in FIGS. 4 and 10, right low gear brake 32 is fully engaged at this half-turn position corresponding to 13 ½° of cam travel.

At the same time, pressure $P_1$ is communicated by way of lines 164 and 166, annulus 214, passage 216, and annulus 218 to left high gear brake 30'. At this point, pressure $P_3$ is blocked by the selector spool 202. Under this half-turn condition, the track speed ratio approaches 1.5:1 resulting in a fixed turning radius of approximately 19 feet with substantially no track slippage. It should be noted that a power turn is thus provided with positive, full engagement of the brakes rather than slipping engagement which permits the maximizing of power transfer efficiency due to the elimination of brake slipping which causes friction power losses.

At 17.5°, the cams are centered in their half-turn position, as best seen in FIGS. 7 and 11.

Figure 5:
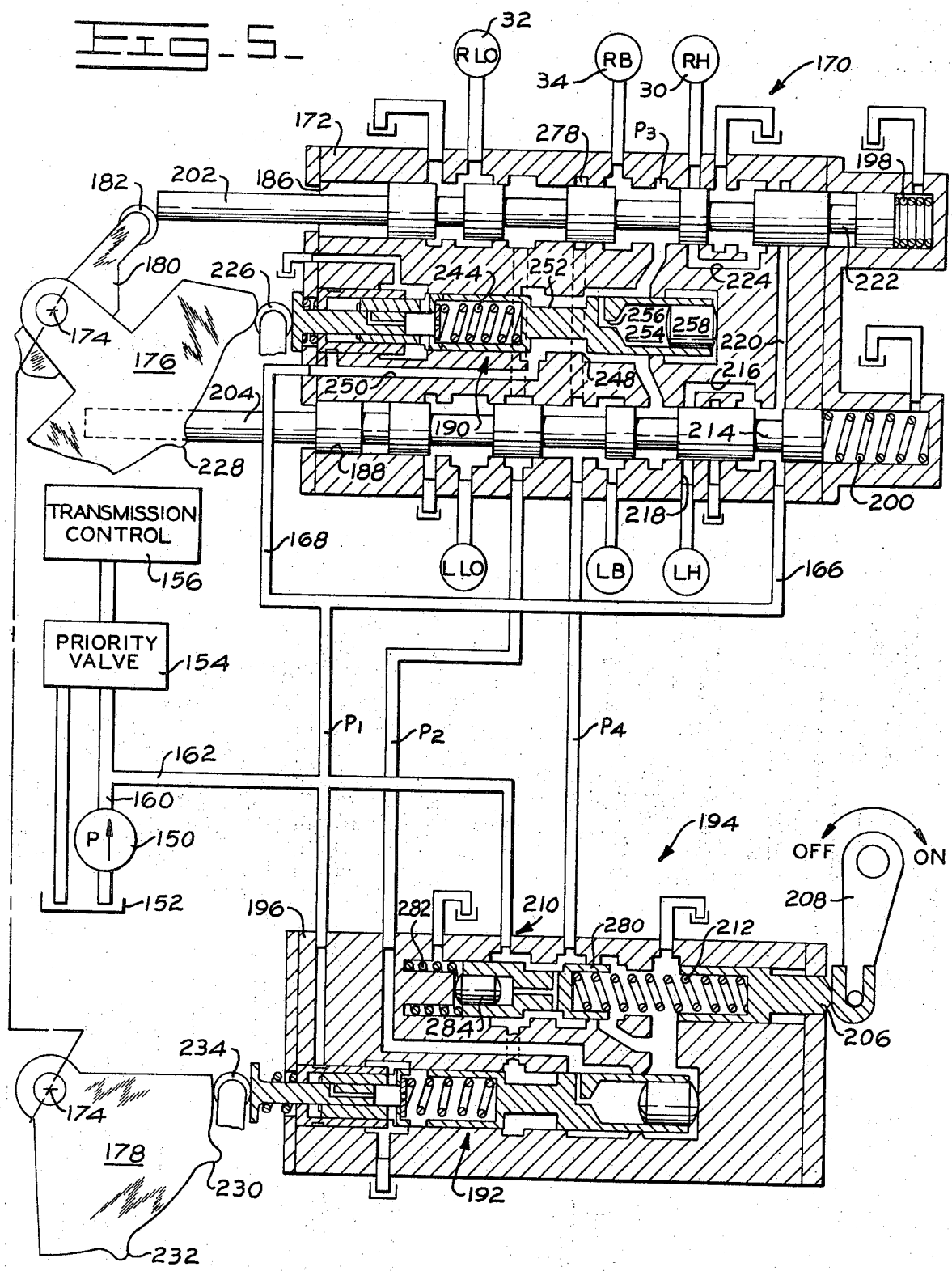
FIG. 5 is a view of the same position for a half turn as well as showing the service brakes applied.

At 21.5° of cam movement, upper selector spool 202 closes annulus 278 of valve 170. Reference may also be had to FIG. 12 which illustrates the position of spool 202 with respect to the valve housing at this point. At the same time, the low reducing valve system creating $P_2$ has a lowering of pressure caused by cam 178. Continued clockwise rotation of the cam develops the indicated slipping brake pressure profile until 31° of cam movement is achieved and the low brake is drained and reducing valve opens completely to direct full pressure to brake 34. As shown in FIG. 5, a full right turn is thus provided. Reference may be had to FIGS. 13 and 14 which also show this condition by the positioning of the selector spool 202.

FIG. 5 also shows the state of valve 194 when the operator has fully depressed the service brake pedal which actuates the pressure reducing valve 210 and provides pressure $P_4$ to the left service brake to halt the machine. This pressure is summed with $P_3$ already applied to the right service brake. As previously mentioned, piston 206 of reducing valve 210 acts against the bias of spring 212, through the action of lever 208. Spring 212, in turn, acts against reducing valve spool 280. Reducing valve spool 280 is urged rightwardly by the combined biasing action of spring 282 and pressure $P_4$ acting on slug 284 contained within the bore and said spool.

It may be noted that the entire modulated turn sequence is reversed when the transition is made from brake to high as the wheel is turned counterclockwise. The same brake pressures shown in FIG. 7 result.

Brake modulation is accomplished even with a sudden snap shifting of the steering wheel by virtue of the inherent control rate of fluid provided to chambers 262 by orifice 266 as best seen in FIG. 6. It may be noted also that tang projections 286 on the left face of piston 240 are provided to insure fluid access to the face of the piston.

It is to be understood that the foregoing description is merely illustrative of the preferred embodiment of the invention and that the scope of the invention is not to be limited thereto, but is to be determined by the scope of the appended claims.

What is claimed is:

1. In a transmission, a power shift unit providing a plurality of drive ratios,
   right and left drive members,
   right and left cross drives each having
   high and low speed brake means for selectively connecting said power shift unit to said right and left drive members, respectively,
   right and left service brake means for selectively braking said right and left drive members, respectively,
   manually operable steering means actuatable to the right or left steering positions for actuating
   control system means for controlling said right and left high and low speed and service brake means whereby power turns to either the right or left direction are provided by the gradual disengagement of said high speed brake means and a gradual corresponding engagement of said low speed brake means as the steering means is moved from its normal position, and whereby still further movement of said steering means provides a gradual disengagement of said low speed brake means and a corresponding gradual engagement of said service brake means for an essentially pivot turn, and further including lubricant system means comprising a source of lubricant pressure for supplying lubricant under pressure to said cross drives,
   passage means for directing fluid from said lubricant pressure source to said high and low speed brake means and to said service brake means, and wherein
   said high and low speed brake means comprise a first and a second planetary set, respectively, said first planetary set comprising
   a first planet carrier, said second planetary set comprising a second planet carrier, said passage means comprising passages in said first and second planet carriers, wherein said first planet carrier comprises a generally annular member, said second planet carrier comprises a generally annular member, an annulus located in an end of said first planet carrier, an end of said second planet carrier fitted within said annulus so as to define an annular chamber therebetween, and wherein said passages in said first and second planet carriers communicate with said annular chamber.

2. The invention of claim 1 wherein each of said right and left cross drives comprise a housing, said high and low speed brake means are located within said housing, said first planetary set further comprises a high-speed clutch operably connected to said first planetary set for operation thereof, and further including slots in said housing adjacent said high speed clutch for draining lubricant from said high speed clutch.

3. The invention of claim 1 wherein said first planetary set further comprises a plurality of first planets rotatably supported on said first planet carrier by a plurality of first planet bearings, and, wherein said second planetary set further comprises a plurality of second planets rotatably supported on said second planet carrier by a plurality of second planet bearings, and, wherein said passage means comprise passages in said first and second planet carriers located so as to direct lubricant onto said bearings.

* * * * *